(12) United States Patent
DeLaCruz

(10) Patent No.: US 6,999,989 B2
(45) Date of Patent: Feb. 14, 2006

(54) METHODS FOR PROVIDING VIDEO ENHANCED ELECTRONIC MAIL RETURN RECEIPTS

(75) Inventor: Cedric G. DeLaCruz, Maplewood, NJ (US)

(73) Assignee: AT&T Corp., Bedminster, NJ (US)

( * ) Notice: Subject to any disclaimer, the term of this patent is extended or adjusted under 35 U.S.C. 154(b) by 751 days.

(21) Appl. No.: 09/821,353

(22) Filed: Mar. 29, 2001

(65) Prior Publication Data
US 2002/0143881 A1    Oct. 3, 2002

(51) Int. Cl.
G06F 15/16    (2006.01)
G06F 15/167   (2006.01)
G06F 3/00     (2006.01)

(52) U.S. Cl. ............... 709/204; 709/206; 709/217; 709/216; 709/250; 709/300; 709/302; 715/752

(58) Field of Classification Search .......... 379/88; 709/209, 203, 206; 725/105
See application file for complete search history.

(56) References Cited

U.S. PATENT DOCUMENTS

| | | | |
|---|---|---|---|
| 5,806,005 A * | 9/1998 | Hull et al. | 455/566 |
| 5,841,966 A * | 11/1998 | Irribarren | 709/206 |
| 5,850,520 A * | 12/1998 | Griebenow et al. | 709/206 |
| 6,014,689 A * | 1/2000 | Budge et al. | 709/206 |
| 6,032,126 A * | 2/2000 | Kaehler | 705/16 |
| 6,064,723 A * | 5/2000 | Cohn et al. | 379/88.14 |
| 6,223,213 B1 * | 4/2001 | Cleron et al. | 709/206 |
| 6,304,897 B1 * | 10/2001 | Venkatraman et al. | 709/206 |
| 6,522,333 B1 * | 2/2003 | Hatlelid et al. | 345/474 |
| 6,698,021 B1 * | 2/2004 | Amini et al. | 725/105 |
| 2001/0004743 A1 * | 6/2001 | Krueger et al. | 709/206 |
| 2002/0056123 A1 * | 5/2002 | Liwerant et al. | 725/87 |
| 2002/0082853 A1 * | 6/2002 | Goodwin | 705/1 |
| 2002/0087642 A1 * | 7/2002 | Wei et al. | 709/206 |

FOREIGN PATENT DOCUMENTS

JP    2000-069450    *    3/2000

OTHER PUBLICATIONS

"Virtual Voice's Back Door" Dec. 1996.*
"Screen Phone" Oct. 13, 1999.*
RFC 1889, 1996.*
"Mac Efficiency 101: Return receipt email", Feb. 7, 2001.*

* cited by examiner

Primary Examiner—Nabil El-Hady
Assistant Examiner—Chad Zhong

(57) ABSTRACT

A method for providing electronic mail return receipts with video of the electronic mail recipient is disclosed. The electronic mail recipient opens an electronic mail message which initiates recording of the electronic mail recipient. The recording may be terminated when the recipient closes the electronic mail or minimizes the electronic mail message window. Recording may also end after a predetermined amount of time after the electronic mail message is opened.

13 Claims, 4 Drawing Sheets

METHODS FOR PROVIDING VIDEO ENHANCED ELECTRONIC MAIL RETURN RECEIPTS

BACKGROUND OF THE INVENTION

In a conventional paper mail context, return receipts provide valuable information to senders of mail. With the return receipt, the sender can verify that the intended recipient received the mail where otherwise the sender would have to rely on, for example, contacting the recipient directly to confirm that the mail was received. Similarly, in an electronic mail context, return receipts are available to provide the sender of an electronic mail message some feedback as to the status of their electronic mail message. For example, the electronic mail message return receipt may provide information such as if the electronic mail message was received, opened or deleted unread.

However, the major drawback of prior art electronic mail return receipts is that, while helpful, current incarnations of these return receipts are still very impersonal. For example, no current return receipt provides the ability to see the electronic mail message recipient's facial expression/reaction when reading the electronic mail message.

Accordingly, it would be desirable to have a method for improving the shortcomings of prior art electronic mail message return receipts. It would be further desirable to have a method for providing an electronic mail message return receipt which provides some feedback as to the electronic mail message recipients' reaction to reading the electronic mail message.

SUMMARY OF THE INVENTION

The present invention is an electronic mail message return receipt which includes video of the electronic mail message recipient reading the electronic mail message. In the present invention, a first user (message sender or originator) composes an electronic mail message which specifies at least one electronic mail message recipient for which an electronic mail message return receipt is required. The electronic mail message is sent to the recipient and when the electronic mail message is opened by the recipient, a video capture of the electronic mail message recipient is initiated, such as via a video capturing device at the electronic mail message recipient's end.

The video capturing device records the recipient while the electronic mail message recipient reads the message. The video capturing device then stops recording when the electronic mail message recipient stops reading the message. A return receipt is then sent to the first user which includes the video of the electronic mail message recipient reading the electronic mail message. The first user can then watch the electronic mail message recipient reading the message and thus can see the recipient's reaction when reading the electronic mail message. In one embodiment, the return receipt may be an electronic mail message provided to the sender with the video of the recipient attached thereto. In one embodiment, audio may also be provided along with the video.

DETAILED DESCRIPTION OF PREFERRED EMBODIMENTS

Figure 1:
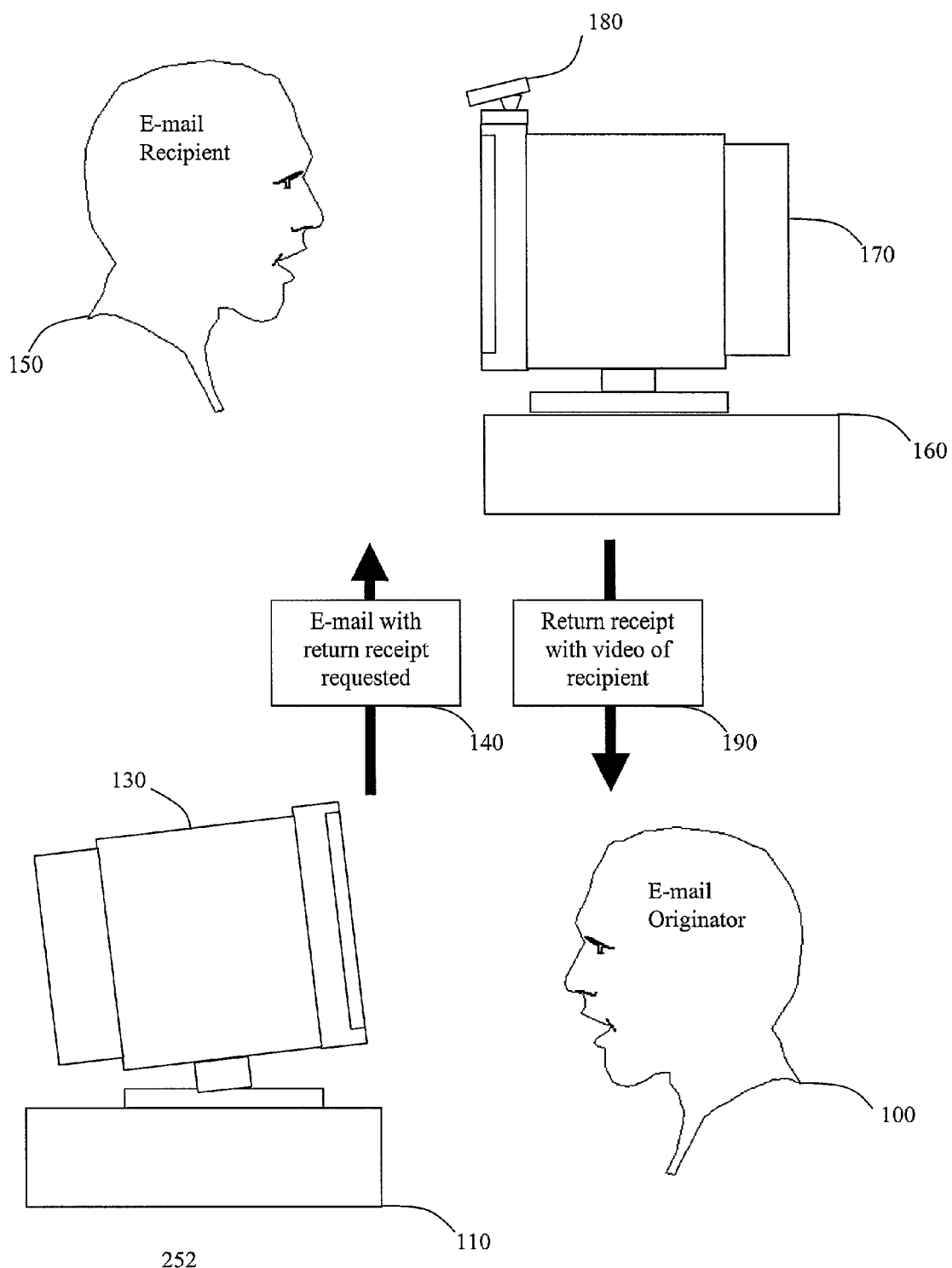
FIG. 1 shows an exemplary configuration for providing electronic mail message return receipts with video enhancement in accordance with the teachings of the present invention.

The present invention is a method for providing improved electronic mail message receipts between two or more electronic mail message users. Referring to FIG. 1, an exemplary configuration for implementing the present invention is shown. In this exemplary embodiment, an electronic mail message originator or sender employs an electronic mail message compatible device, such as a personal computer 110 having a display screen 130 to at least send an electronic mail message 140 to one or more designated electronic mail message recipients. In the present invention, electronic mail message originator 100 specifies that he/she would like a electronic mail message return receipt associated with the receipt of electronic mail message 140 by one or more of the designated electronic mail message recipients, such as by electronic mail message recipient 150.

Electronic mail message recipient 150 also employs an electronic mail message compatible device, such as a personal computer 160 having a display screen 170. Additionally, a video capturing device 180 is coupled to the personal computer 160 in a manner as known in the art. Upon receiving electronic mail message 140, it is contemplated that electronic mail message recipient 150 will some time thereafter read the electronic mail message 140. Typically, this is accomplished by electronic mail message recipient selecting and "opening" the electronic mail message 140 from within some electronic mail message facility or software. In the present invention, upon "opening" of the electronic mail message 140, the video capturing device 180 is activated to begin capturing the video of electronic mail message recipient reading electronic mail message 140. Upon the closing, minimizing of electronic mail message 140 or at some predetermined time later, the video capturing is terminated and a return receipt 190 having the captured video of electronic mail message recipient 150 is provided back to electronic mail message originator 100.

In the present invention, the electronic mail message users, such as electronic mail message originator 100 and electronic mail message recipient 150 communicate and interact with each other over a communications network, such as the Internet, which may be provided to the user via a broadband network connection, Integrated Services Digital Network (ISDN) line, conventional telephone line, or other similar network. In the present invention, at least one of the communicating parties, such as electronic mail message recipient 150 should have a device capable of capturing video of the electronic mail message recipient 150 reading the electronic mail message. The video capturing device may also have the capability to capture audio of the electronic mail message recipient 150, such as via a microphone which may be coupled to the video capturing device. It is contemplated that the electronic mail message originator also have such a video capturing device.

Software is typically provided on computers and which interacts with the video display screens and and the video cameras and during a video call/conference to render and provide images of the call/conference participants to one another during the call/conference. Typically the images of the call/conference participants are provided via video display windows and which can be seen via video display screens and. In the present invention, the video display windows and are movable so that call/conference participants and can move their respective video display windows and to fixed predetermined areas within their respective video display screens and. Preferably, the fixed predetermined areas or bound.

Figure 2:
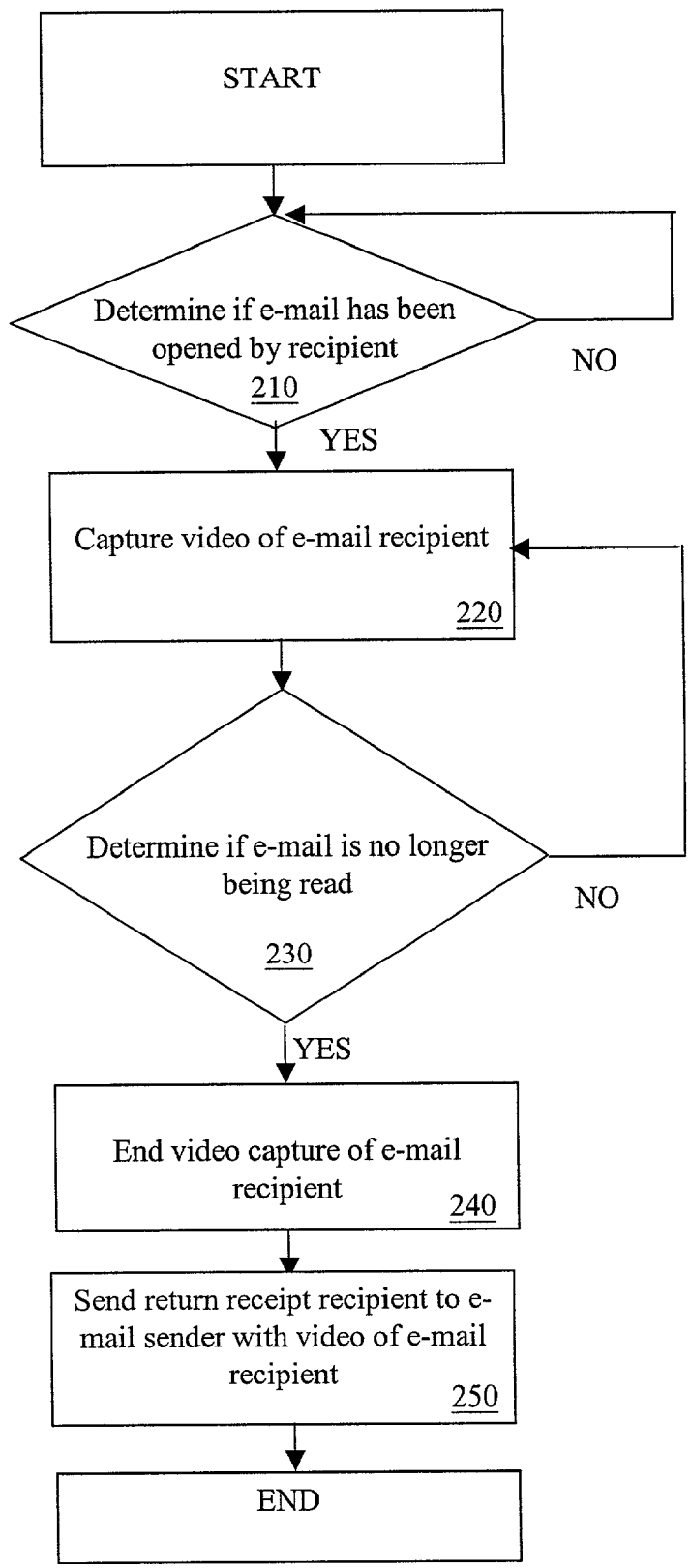
FIG. 2 is a flow chart of an exemplary method in accordance with the teachings of the present invention.

Referring to FIG. 2, an exemplary embodiment of the present invention is shown. Once the electronic mail message recipient as shown and described earlier herein has received the electronic mail message from electronic mail message sender, it is determined if the electronic mail message has been opened by electronic mail message recipient, step 210. If the electronic mail message has not been opened, no action is taken. If the electronic mail message has been opened, video of the electronic mail message recipient is captured, step 220. It is then determined if the electronic mail message is no longer being read by electronic mail message recipient, step 230. For purposes of the present invention, the term "no longer being read" may have a number of meanings. For example, in one embodiment, "no longer being read" may be when the electronic mail message recipient closes the window which contains the electronic mail message which the electronic mail message recipient was reading. In another embodiment, "no longer being read" may mean when the window which contains the electronic mail message which the electronic mail message recipient was reading is minimized or overlaid by another window. In yet another embodiment, a predetermined time limit may be set to decide when the electronic mail message is "no longer being read". For example, a time limit of two minutes may be set such that if none of the aforementioned activities, such as the closing or minimizing of the electronic mail message window occur before two minutes, the electronic mail message will qualify as "no longer being read."

Once it is determined that the electronic mail message is no longer being read, the video capture of the electronic mail message is ended or terminated, step 240. An electronic mail message return receipt containing the video of the electronic mail message recipient is provided to the electronic mail message sender or originator, step 250. In one embodiment of the present invention, the return receipt is an electronic mail message sent back to the electronic mail message sender or originator which contains the video of the electronic mail message recipient as a file attachment. The video captured may be stored in any number of formats such as AVI, MPG, QUICKTIME, REAL VIDEO and other similar formats. In an alternative embodiment of the present invention, the video of the electronic mail message recipient may be provided along with the electronic mail message return receipt in the form of a link to a video file which may be stored remotely, such as on a network server.

In the present invention, software which implements the methods disclosed herein may be provided as add-ins to the user's existing e-mail programs or such code to, for example, detect the opening and closing of an electronic mail message and activate the video capturing device may be transported along with the electronic mail message each time. For example, executable code may be provided along with the electronic mail message which is activated upon the opening of an electronic mail message.

Figure 3:
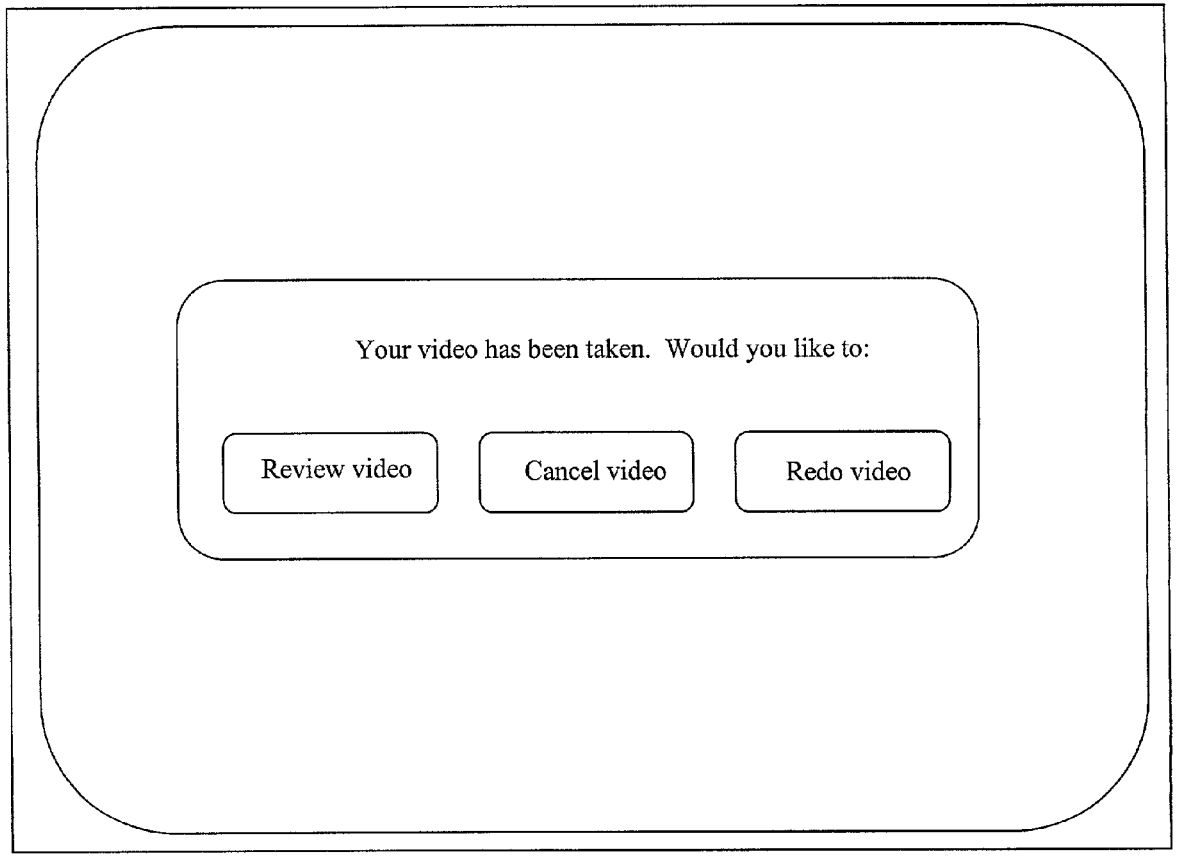
FIG. 3 shows an exemplary screen display in accordance with the teachings of the present invention.

It is contemplated that the present invention may be freely used among friends and associates but a security mechanism may be built to prohibit unauthorized or unwanted recording of electronic mail message recipients. A prompt may be provided either before or after recording which informs the recipient that they have been recorded and whether they wish for the video to be sent back to the sender of the e-mail. For example, referring to FIG. 3, a screen may be provided after a video is taken of the electronic mail message recipient to have the recipient, for example, be able to review the video, cancel the video and/or redo the video.

Figure 4:
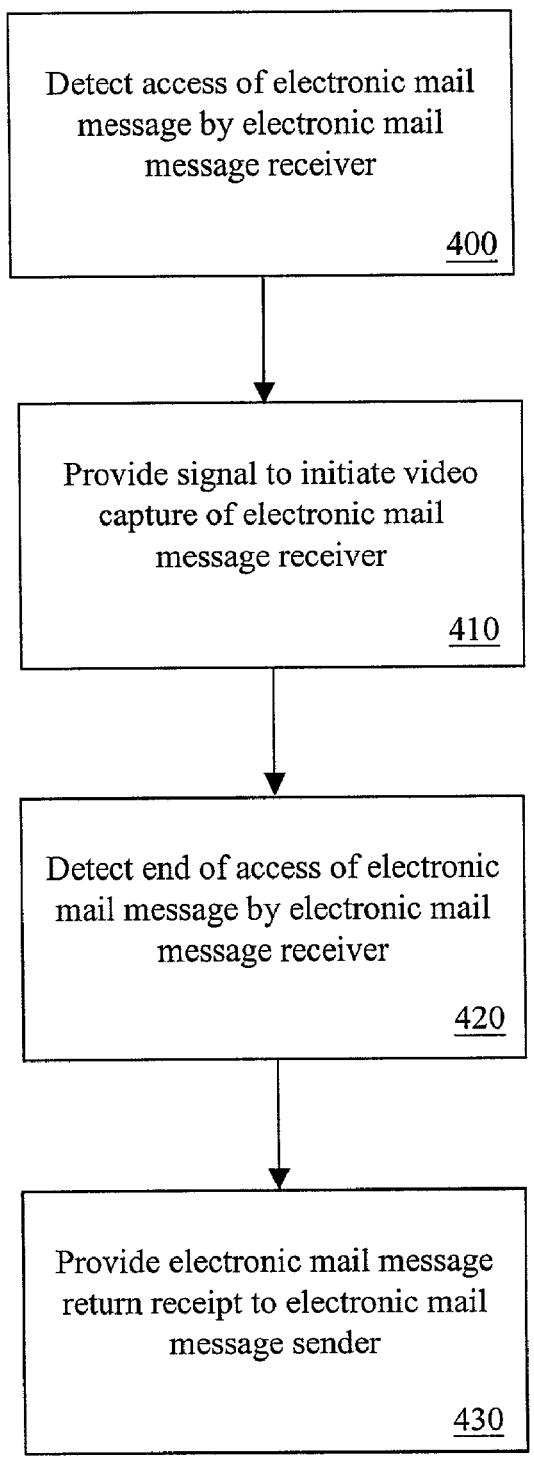
FIG. 4 is a flow chart of another exemplary method in accordance with the teachings of the present invention.

Referring to FIG. 4, another embodiment of the present invention is shown. In this embodiment, access of an electronic mail message by an electronic mail message receiver is detected, step 400. Access can be detected in a number of fashions, such as determining when the electronic mail message receiver selects a designated electronic mail message which has a return receipts condition attached to it. Upon detection of access, a signal to initiate video capture of electronic mail message receiver is provided, for example, to a video capturing software facility which is in communication with a video camera, step 410. The end of access of the electronic mail message by the electronic mail message receiver is then detected, step 420. End of access may be detected in a number of fashions, such as determining when the electronic mail message receiver minimizes or closes the designated electronic mail message. Upon detecting of the end of access, an electronic mail message return receipt is provided to the electronic mail message sender, step 430.

One exemplary application for the present invention would be for electronic greeting cards sent via electronic mail. For example, for birthday greetings, the sender of the electronic mail birthday greeting would get a video of the birthday recipient reading their birthday card. Other type of special occasion greetings send via electronic mail would be ideal candidates for the video enhanced electronic mail message return receipt.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

I claim:

1. A method for providing video enhanced electronic mail message return receipts between at least one electronic mail message originator and at least one electronic mail message recipient, the method comprising:

receiving an electronic mail message which requires a video enhanced electronic mail message return receipt when received by the at least one electronic mail message recipient;

providing the electronic mail message to the at least one electronic mail message recipient;

determining when the at least one electronic mail message recipient starts reading the electronic mail message;

starting a video capture of an electronic mail message recipient's reaction when the at least one electronic mail message recipient starts reading the electronic mail message;

determining when the at least one electronic mail message recipient stops reading the electronic mail message;

ending the video capture of the electronic mail message recipient's reaction when the at least one electronic mail message recipient stops reading the electronic mail message;

attaching the captured video of the electronic mail message recipient's reaction as part of the video enhanced electronic mail message return receipt; and returning the video enhanced electronic mail message return receipt to the electronic mail message originator, wherein the electronic mail message originator views the electronic mail message recipient's reaction reading the electronic mail message.

2. A method for providing video enhanced electronic mail message return receipts, the method comprising:

determining when an electronic mail message recipient has started reading an electronic mail message which requires a video enhanced electronic mail message return receipt;

start taking a video of the electronic mail message recipient's reaction when the electronic mail message recipient has started reading the electronic mail message;

determining when the electronic mail message recipient has stopped reading the electronic mail message;

stop taking the video of the electronic mail message recipient's reaction when the electronic mail message recipient has stopped reading the electronic mail message; and providing the video of the electronic mail message recipient's reaction as an attachment to the video enhanced electronic mail message return receipt and returning the video enhanced electronic mail message return receipt back to the electronic mail message's originator who specified the video enhanced electronic mail message return receipt requirement.

3. The method of claim 2, wherein determining when the electronic mail message recipient has started reading the electronic mail message which requires the electronic mail message return receipt comprises:

detecting when the electronic mail message is opened.

4. The method of claim 2, wherein determining when the electronic mail message recipient has stopped reading the electronic mail message comprises:

detecting when the electronic mail message is closed.

5. The method of claim 2, wherein determining when the electronic mail message recipient has stopped reading the electronic mail message comprises:

detecting when the electronic mail message is minimized.

6. The method of claim 2, further comprising:

halting the video taking after a predetermined time limit.

7. The method of claim 2, wherein taking video of the electronic mail message recipient when the electronic mail message recipient has opened the electronic mail message comprises:

providing a signal to a video camera to begin taking video.

8. A method for providing video enhanced electronic mail message return receipts between electronic mail correspondents, the method comprising:

receiving an electronic mail message having video enhanced return receipt specified for the electronic mail message by a sender of the electronic mail message;

providing the electronic mail message to at least one designated electronic mail message recipient;

determining when the at least one electronic mail message recipient opens the electronic mail message;

start capturing the at least one electronic mail message recipient's reaction on video upon opening of the electronic mail message by the at least one electronic mail message recipient;

determining when the at least one electronic mail message recipient closes the electronic mail message;

stop capturing the at least one electronic mail message recipient's reaction on video upon closing of the at least one electronic mail message by the at least one electronic mail message recipient; and providing a video enhanced electronic mail message return receipt to the sender of the electronic mail message, wherein the video enhanced electronic mail message return receipt includes the video of the electronic mail message recipient's reaction captured while reading the electronic mail message.

9. The method of claim 8, wherein a signal is provided to a video camera upon opening of the electronic mail message by the at least one electronic mail message recipient.

10. The method of claim 8, wherein the video is attached as a file to the electronic mail message return receipt.

11. The method of claim 8, wherein the video includes audio of the at least one electronic mail message recipient.

12. The method of claim 8, further comprising:

providing the at least one electronic mail message recipient the opportunity to review and cancel the video if desired by the at least one electronic mail message recipient.

13. The method of claim 8, wherein the video is provided as a link to the video file.

* * * * *